United States Patent [19]

Pulak

[11] 4,065,269
[45] * Dec. 27, 1977

[54] SPENT CATALYST REGENERATION APPARATUS

[75] Inventor: Richard P. Pulak, Palatine, Ill.

[73] Assignee: UOP Inc., Des Plaines, Ill.

[ * ] Notice: The portion of the term of this patent subsequent to Apr. 27, 1993, has been disclaimed.

[21] Appl. No.: 676,254

[22] Filed: Apr. 12, 1976

Related U.S. Application Data

[63] Continuation-in-part of Ser. No. 429,422, Dec. 28, 1973, Pat. No. 3,953,175.

[51] Int. Cl.² .............................. B01J 8/08; B01J 8/18; B01J 37/14
[52] U.S. Cl. .............................. 23/288 B; 23/288 S; 208/164; 252/417
[58] Field of Search .............. 23/288 B, 288 S, 288 E; 252/417; 208/164

[56] References Cited

U.S. PATENT DOCUMENTS

| | | | |
|---|---|---|---|
| 2,929,774 | 3/1960 | Smith | 23/288 S X |
| 3,208,831 | 9/1965 | Belden | 23/288 S |
| 3,351,548 | 11/1967 | Payne et al. | 208/120 |
| 3,677,715 | 7/1972 | Morrison et al. | 23/288 S |
| 3,821,103 | 6/1974 | Owen et al. | 252/417 X |
| 3,843,330 | 10/1974 | Connor et al. | 23/288 B |
| 3,844,973 | 10/1974 | Stine et al. | 23/288 B X |
| 3,847,793 | 11/1974 | Schwartz et al. | 252/417 X |
| 3,893,812 | 7/1975 | Connor et al. | 23/288 B |
| 3,898,050 | 8/1975 | Strother | 23/288 B |
| 3,904,548 | 9/1975 | Fagan et al. | 23/288 B X |
| 3,926,778 | 12/1975 | Owen et al. | 252/417 X |
| 3,953,175 | 4/1976 | Pulak | 23/288 B |

*Primary Examiner*—Joseph Scovronek
*Attorney, Agent, or Firm*—James R. Hoatson, Jr.; Thomas K. McBride; William H. Page, II

[57] ABSTRACT

A catalyst regeneration process and apparatus for the oxidation of coke from a spent catalyst and for the conversion of CO resulting from the oxidation of coke to $CO_2$.

Novel feature of the process is the mixing of a portion of regenerated catalyst produced in a coke oxidation zone and heated to a higher temperature in a CO-conversion zone with spent catalyst and passing the mixture to a coke-oxidation zone to increase the temperature within the coke oxidation zone and to disperse spent catalyst more evenly across that zone thereby increasing the rate, extent and evenness of coke oxidation. The regeneration apparatus includes components by which this can be accomplished.

7 Claims, 1 Drawing Figure

SPENT CATALYST REGENERATION APPARATUS

CROSS-REFERENCE TO RELATED APPLICATIONS

This application is a continuation-in-part application of my prior copending application Ser. No. 429,422 filed Dec. 28, 1973 issued Apr. 27, 1976 as U.S. Pat. No. 3,953,175, all of the teachings of which are incorporated herein by specific reference thereto.

BACKGROUND OF THE INVENTION

1. Field of the Invention

The field of art to which this invention pertains is catalyst regeneration. More specifically, the present invention relates to a regeneration process for regenerating spent fluidizable catalytic cracking catalyst and a regeneration apparatus for use in the practice of the process.

2. Description of the Prior Art

In most regeneration processes presently employed the oxidation of coke from spent catalyst is done in a single-vessel regeneration zone containing one or more dense beds located in the bottom of the zone with a large dilute-phase disengaging space positioned above and in connection with the dense bed. In this type of regeneration process the dense bed is maintained in the bottom portion of the regeneration zone by limiting the superficial velocity of the incoming fresh regeneration gas to the transport velocity, that is, the velocity above which large amounts of catalyst would be carried out of the dense bed to the disengaging space. Typical velocities are therefore less than about 3 feet per second with 1.5 to 2.5 being the usual range. Any catalyst entrained in the flue gas effluent passing from the dense bed is recovered and returned to the same dense bed by passing this effluent flue gas containing entrained catalyst through separation means such as cyclone separation devices located in the disengaging space and directing separated catalyst to the dense bed. Average residence time of the catalyst within the regeneration zone per pass through the zone is generally in the two to five minute range with 2 to 3 minutes being the more common, while the residence time of gas is generally within the range of 10 to 20 seconds. All of the regenerated catalyst is returned directly from the regeneration zone to the hydrocarbon reaction zone without additional passes through any part of the regeneration zone.

Most regeneration processes are also operated to essentially preclude significant CO combustion by controlling the oxygen-containing gas stream introduced into the process to maintain a rather small predetermined temperature differential between a flue-gas-outlet or a disengaging-space temperature and a dense-bed temperature within the regeneration zone. Excess oxygen within the regeneration zone is thus minimized thereby severely limiting CO combustion to only that amount characterized by the small temperature differential. Since the conversion of CO to $CO_2$ is quite exothermic, this restricting of CO afterburning in most typical regeneration zones is done for the very practical reason of avoiding the damaging effects of excessively high temperatures in the upper disengaging space region of the regeneration apparatus where there is little catalyst present to act as a heat sink. This practice of admitting oxygen-containing gas into the process based upon a temperature differential, as exemplified by Pohlenz U.S. Pat. Nos. 3,161,583 and 3,206,391, produces a small amount of oxygen in the flue gas, generally in the range of about 0.1 to 1% oxygen, results in the flue gas containing from about 7 to about 14 vol. % CO and limits the tempertures achieved in the regeneration apparatus to a maximum of about 1275° F. Typically, the flue gas from such processes is directed to the atmosphere where permitted by local air quality standards or to a CO boiler where it is used as fuel to make steam.

Limiting the superficial velocities within the regeneration apparatus and controlling the amount of fresh regeneration gas to eliminate significant CO combustion essentially fixes the degree of catalyst regeneration, that is, the amount of residual coke of regenerated catalyst. Although it is widely known that the residual coke content on regenerated catalyst has a great influence on the conversion and product distribution obtained from the hydrocarbon reaction zone, residual coke level on regenerated catalyst produced by present regeneration processes conducted in conventional regeneration apparatus is not an independent variable but is fixed for each regeneration apparatus design at a level typically from about 0.1 to about 0.4 wt. % carbon.

Catalyst regeneration processes described in the recent prior art have recognized the advantages of essentially completely converting CO to $CO_2$ and recovering at least a portion of the heat of combustion of CO both within the regeneration zone. Examples of such regeneration processes are Stine et al U.S. Pat. No. 3,844,973 and Horecky, Jr. et al U.S. Pat. No. 3,909,392. The advantages of such processes are now well known; such regeneration processes permit the reduction or elimination of feed preheat, the elimination of CO air pollution without the need for external CO boilers, and, when coupled with hydrocarbon-reaction zones of modern design, improved yields of more valuable products. The prior art has not, however, recognized the importance of evenly dispersing spent catalyst across the inside cross-sectional area of the regeneration zone so that fresh regeneration gas is used efficiently and coke and CO oxidation may proceed uniformly. In CO-burning catalyst regeneration processes where the refiner is usually concerned with not exceeding a specified air quality CO emission standard efficient use of fresh regeneration gas and uniform oxidation of coke and CO are particularly important. Maldistribution of spent catalyst within the regeneration zone and uneven coke and CO oxidation may require that the rate of fresh regeneration gas be increased in order to achieve a CO emission limitation. Besides reducing the coke burning capacity of the regeneration zone, an increased fresh regeneration gas rate beyond that required when there is even distribution spent catalyst within the regeneration zone may also increase the loading of the cyclone separation devices in the regeneration zone thereby resulting in higher particulate emissions.

The regeneration process of my invention provides for more even dispersion of spent catalyst within the regeneration zone, more uniform combustion of coke and CO and for the recovery and use of at least a portion of the heat of combustion of CO within the regeneration zone.

The apparatus of my invention recognizes the differences in the kinetics of coke oxidation and CO oxidation and provides separate regions within the regeneration apparatus for each to take place. Fresh regeneration gas and spent catalyst are passed into a dense bed of fluidized catalyst in the spent-catalyst receiving chamber to produce regenerated catalyst and partially-spent regeneration gas which are passed in admixture through a transfer conduit where additional CO oxidation takes place and where at least a portion of the heat of combustion is transferred to the regenerated catalyst passing through that conduit. The resulting hot regenerated catalyst and spent regeneration gas are separated within a regenerated-catalyst receiving chamber and the regenerated catalyst is directed to a dense bed in the bottom portion of the regenerated-catalyst receiving chamber. A regenerated-catalyst recycle means is provided to return a portion of hot regenerated catalyst from the dense bed of catalyst in the regenerated-catalyst receiving chamber to a spent catalyst conduit. Hot regenerated catalyst is mixed with spent catalyst in the spent catalyst conduit and the mixture is passed to the spent-catalyst receiving chamber thereby increasing the catalyst density and temperature within the chamber and dispersing spent catalyst more evenly across the inside of the chamber. The rate of reaction and catalyst residence time within the spent-catalyst receiving chamber are thus increased and regenerated catalyst having lower levels of residual coke is more uniformly produced within the chamber. Additionally, the rate of CO burning in the transfer conduit is also increased because of a higher inlet temperature thereby producing lower CO concentrations in the spent regeneration gas leaving the apparatus. The remainder of the regenerated catalyst from the regenerated-catalyst receiving chamber is returned to the hydrocarbon reaction zone at a higher temperature than is produced in non-CO-burning catalyst regeneration apparatus thereby permitting reduced hydrocarbon feed preheat requirements.

SUMMARY OF THE INVENTION

It is accordingly a broad objective of my invention to provide a catalyst regeneration process by which coke and CO can be uniformly oxidized and by which at least a portion of the heat of CO combustion can be recovered for use in the process. Specifically it is an objective of my process to recover heat of CO combustion by burning CO in a CO combustion zone in the presence of regenerated catalyst and to utilize the recovered heat by recycling a portion of hot regenerated catalyst to the coke oxidation zone thereby increasing the temperature and catalyst denisty within that zone and hence the rate and extent of coke oxidation. It is another objective of my invention to more efficiently utilize the fresh regeneration gas passed into the process and to produce regenerated catalyst samples of which will have more uniform residual coke concentrations by mixing the portion of hot regenerated catalyst with spent catalyst and passing the mixture to the coke oxidation zone for more even dispersion of the spent catalyst across the inside cross-sectional area of the coke oxidation zone.

It is another objective to provide a regeneration apparatus uniquely suited for use in the practice of my process. It is an additional objective that my apparatus can incorporate with little modification many single-vessel FCC regeneration apparatus presently in commercial use as a component of my apparatus thus saving on construction cost.

In brief summary my invention is, in one embodiment, a regeneration process for oxidizing coke from spent catalyst to produce regenerated catalyst and oxidizing CO, resulting from the oxidation of coke, to $CO_2$ which process comprises the steps of: (a) passing a mixture of a portion of regenerated catalyst at a hereinafter described second temperature and spent catalyst to a coke oxidation zone; (b) passing fresh regeneration gas to said coke oxidation zone and therein oxidizing at oxidation conditions including a first temperature coke and CO to produce regenerated catalyst and partially-spent regeneration gas; (c) passing regenerated catalyst and partially spent regeneration gas to a CO conversion zone and therein converting, at conversion conditions, CO to $CO_2$ to produce spent regeneration gas and regenerated catalyst at a second temperature higher than said first temperature; (d) separating at separation conditions regenerated catalyst from spent regeneration gas; (e) mixing a portion of regenerated catalyst at said second temperature with spent catalyst; and, (f) passing the remainder of regenerated catalyst at said second temperature to a hydrocarbon reaction zone.

In another embodiment my invention is an apparatus for oxidizing coke on spent catalyst which comprises in combination: (a) a spent-catalyst receiving chamber for containing a dense-phase fluidized bed of catalyst having a spent-catalyst inlet means and a fresh-regeneration-gas inlet means connected thereto to allow passage of spent catalyst and fresh regeneration gas respectively into said chamber and having a regenerated-catalyst/regeneration-gas outlet means connected thereto to allow passage of regenerated catalyst and regeneration gas from said chamber; (b) a spent-catalyst conduit connected to said spent-catalyst inlet means; (c) a transfer conduit having a substantially vertical portion and a substantially horizontal portion, said vertical portion having an inlet connected to the regenerated-catalyst/regeneration-gas outlet means and said horizontal portion extending into the side of a hereinafter described regenerated-catalyst receiving chamber and having an outlet within said chamber whereby regenerated catalyst and regeneration gas are carried from said spent-catalyst receiving chamber in admixture to said regenerated-catalyst receiving chamber; (d) a regenerated-catalyst receiving chamber for containing a dense-phase bed of regenerated catalyst said chamber having a regenerated-catalyst outlet means and a spent-regeneration-gas outlet means connected thereto to allow passage of regenerated catalyst and spent regeneration gas from said chamber and said chamber being adjacent to and at an elevation with respect to said spent-catalyst receiving chamber to maintain at least a portion of said dense-phase bed of regenerated catalyst above said dense-phase fluidized bed of catalyst in said spent-catalyst receiving chamber; and (e) an external regenerated-catalyst recycle means, having an inlet means in the regenerated-catalyst receiving chamber and an outlet means in the spent-catalyst conduit, to allow passsage of a portion of regenerated catalyst from the regenerated-catalyst receiving chamber in admixture with spent catalyst in said spent-catalyst conduit to the spent-catalyst receiving chamber.

Other embodiments and objects of the present invention encompass further details such as operating conditions and the function and arrangement of various components of my apparatus all of which are hereinafter disclosed in the following discussion of each of these facets of the invention.

DESCRIPTION OF THE DRAWING

Having thus described the process and apparatus of my invention in brief general terms, reference is now made primarily to the apparatus aspect of my invention and specifically to the drawing depicting the side view of one embodiment of the apparatus. The drawing will also indicate to those skilled in the art how many existing single-vessel regeneration apparatus of the type in common use at the present time might be modified to construct the apparatus of my invention.

While the apparatus described will be in terms of a preferred embodiment, it will be understood that it is not applicant's intention to limit the invention to that embodiment but rather to include all alternatives, modifications, and equivalents as may fairly be within the spririt and scope of the claims appended hereto. It will also be understood that the drawing is only shown in such detail as is necessary for an understanding of the invention and that various items such as minor valves, bleed and dispersion steam lines, expansion joints, instrumentation, and other control means have been omitted for the sake of simplicity.

Figure 1:
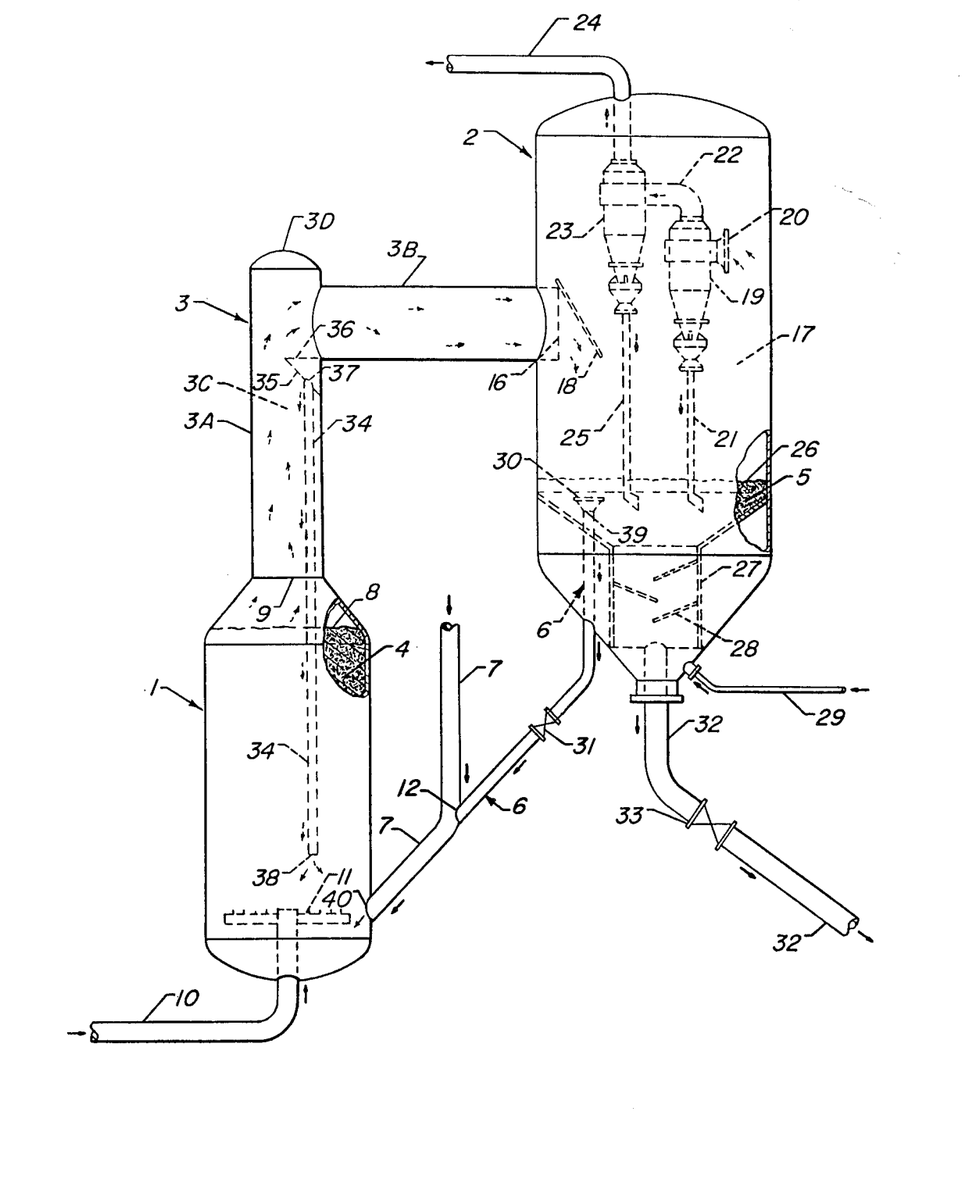

The drawing shows the apparatus of my invention which basically comprises as the largest components a spent-catalyst receiving chamber 1, a regenerated-catalyst receiving chamber 2, and a transfer conduit 3. The basic components of the apparatus are first briefly defined as follows. The term "spent-catalyst receiving chamber" shall mean a chamber for containing a dense-phase fluidized bed of catalyst wherein the majority of coke is oxidized. The term "transfer conduit" as used herein shall mean a conduit in which CO conversion takes place in the presence of dilute-phase fluidized catalyst to produce spent regeneration gas and in which at least a portion of the heat of combustion is transferred to the catalyst. The term "internal regenerated-catalyst recycle means" shall mean that component of the regeneration apparatus by which a portion of regenerated catalyst from the transfer conduit is recycled to the dense-phase bed of catalyst within the spent-catalyst receiving chamber. The term "regenerated-catalyst receiving chamber" shall mean a chamber for separating regenerated catalyst and spent regeneration gas and for containing a dense-phase bed of regenerated catalyst. The term "external regenerated-catalyst recycle means" shall mean that component of the regeneration apparatus by which a portion of regenerated catalyst is recycled from the dense-phase bed of regenerated catalyst within the regenerated-catalyst receiving chamber to the spent-catalyst conduit which is connected to the spent-catalyst receiving chamber. The regenerated-catalyst recycle means are "external" or "internal" regenerated-catalyst recycle means depending upon whether at least some portion of the recycle means is "outside of" or "external to" any other component of the regeneration apparatus in which case it is referred to as an external regenerated-catalyst recycle means or whether the recycle means is "wholly within" or "internal to" to any other component of the regeneration apparatus in which case it is referred to as an internal regenerted-catalyst recycle means.

Spent-catalyst receiving chamber 1, shown in the lower left region of the drawing, has a dense-phase fluidized bed of catalyst 4, having a level or interface 8, maintaned within the chamber. Spent-catalyst receiving chamber 1 has a spent-catalyst inlet means 40 to which is attached spent-catalyst conduit 7 and fresh-regeneration-gas inlet means 10. Spent catalyst from a hydrocarbon reaction zone (not shown) and a portion of hot regenerated catalyst from regenerated-catalyst receiving chamber 2 are continuously introduced to dense bed 4 via spent-catalyst conduit 7. A controlled stream of fresh regeneration gas is continuously introduced via fresh-regeneration-gas inlet means 10 into bed 4 through distributing means 11 which allows the fresh regeneration gas to be more readily dispersed within dense bed 4. I have found that all of the fresh regeneration gas required for coke and CO combustion can be added in this manner to the spent catalyst receiving chamber. There need be no other inlet means for fresh regeneration gas into the apparatus. Typically the distributing means can be a metal plate containing holes or slots or preferably a pipe-grid arrangement, both types of which are familiar to those skilled in the art. Oxidation of the carbonaceous deposits on the spent catalyst takes place in dense bed 4 to produce partially spent regeneration gas and regenerated catalyst both of which pass out of chamber 1 in admixture through regenerated-catalyst/regeneration-gas outlet means 9, located at the top of chamber 1, and into inlet means 9 of transfer conduit 3 in which CO oxidation takes place to produce spent regeneration gas and where a portion of the heat of combustion of carbon monoxide is transferred to the catalyst being transported.

Transfer conduit 3 has a substantially vertical portion 3A and a substantially horizontal portion 3B joined at a substantially right angle and has an interior volume 3C. Substantially vertical portion 3A has an inlet 9 at its lower end which is connected to the regenerated-catalyst/regeneration-gas outlet means of chamber 1. The inlet of transfer conduit 3 is labeled 9 as is the regenerated-catalyst/regeneration-gas inlet means since they are in communication with each other. The mixture of regeneration gas and regenerated catalyst passing through portion 3A of tranfer conduit 3 is directed by the substantially right angle to substantially horizontal section 3B of transfer conduit 3. The substantially horizontal portion 3B extends into the side of regenerated-catalyst receiving chamber 2 and has an outlet means 16 which may comprise single or multiple openings located within chamber 2 to allow catalyst and spent regeneration gas to pass out of the transfer conduit 3. Cap 3D is located at the upper end of the vertical portion 3A and is so positioned that a certain volume of the vertical portion is contained above the top of horizontal portion 3B. This section provides volume which can fill up with the catalyst and gas mixture thereby creating a cushion which prevents attrition in the upper end of the vertical portion when catalyst particles are directed from the vertical portion to the horizontal portion of the transfer conduit. The primary reason for the transfer conduit 3 having both substantially vertical portion 3A and substantially horizontal portion 3B and the reason for the entrance of horizontal portion 3B into the side of regenerated-catalyst receiving chamber 2 is so that existing single-vessel regeneration apparatus can be used, without having to be relocated from their existing position, as regenerated-catalyst receiving chamber 2 of my invention. Being able to utilize existing single-vessel regeneration apparatus in its original position permits savings in construction costs. More specifically, it is necessary that the spent-catalyst receiving chamber 1 be positioned at an elevation with respect to the regenerated-catalyst receiving chamber to maintain at least a portion of the dense-phase bed of catalyst 5 in chamber 2 above dense-phase bed of catalyst 4 in chamber 1 thus maintaining the head necessary to ensure the flow of hot regenerated catalyst from the dense-phase bed 5 into spent-catalyst conduit 7 and then into dense-phase bed 4 in spent-catalyst receiving chamber 1. This requirement, coupled with the fixed location of the old single-vessel regeneration apparatus, dictates the particular configuration of transfer conduit 3 and its side entrance into regenerated-catalyst receiving chamber 2. With this design, the elevation relationship is achieved without having to relocate the existing single-vessel regeneration apparatus used as regenerated-catalyst receiving chamber 2. So positioned in this manner, the chambers 1 and 2 will be adjacent to each other.

Regenerated-catalyst receiving chamber 2 contains a dilute-phase disengaging space 17 in the upper portion of the chamber in which cyclone separation means 19 and 23 are located and contains a dense-phase bed of regenerated catalyst 5 having a level or interface 26 in the lower portion of the chamber. Chamber 2 will be recognized by those skilled in the art of FCC processes as very similar to many single-vessel regeneration apparatus now commonly used for catalyst regeneration. The drawing indicates that the apparatus of my invention can be constructed by modifying that vessel into a regenerated-catalyst receiving chamber and by adding a new spent-catalyst receiving chamber, transfer conduit and regenerated-catalyst recycle means. Portion 3B of conduit 3 extends into disengaging space 17 and the transfer conduit outlet means 16 is located within chamber 2 above interface 26 of dense bed 5. Outlet means 16 will be connected to or in communication with a separation means whereby catalyst and regeneration gas passing out of conduit 3 can be separated. Separation means which can be employed shall include: a disengaging space by itself in which separation of regenerated catalyst and spent regeneration gas takes place by a sudden decrease in velocity of the mixture of catalyst and gas leaving outlet means 16; cyclone separation means arranged in prallel or series flow arrangements to achieve the desired degree of separation; or, combinations of disengaging space and cycle separation means. In the preferred embodiment indicated in the drawing the separation means is a combination of disengaging space 17 and cyclone separation means 19 and 23 which combination is effectively used to achieve the desired degree of separation. Regenerated catalyst and spent regeneration gas pass out of the transfer conduit 3 through outlet means 16 and into disengaging space 17 where some separation of catalyst and gas occurs by the sudden decrease in the velocity of the mixture. Baffle plate 18 directs the flow of catalyst and gas in a generally downward direction within the vessel. Spent regeneration gas and entrained catalyst pass from disengaging space 17 into cyclone separation means 19, through inlet 20. Spent regeneration gas substantially free of catalyst passes out of cyclone separation means 19 through outlet conduit 22 while separated catalyst passes through dipleg 21 directed downward toward dense bed 5. Outlet conduit 22 directs separated spent regeneration gas containing small amounts of entrained spent catalyst from cyclone separation means 19 into another cyclone separation means 23. Spent regeneration gas is again separated from regenerated catalyst in cyclone separation means 23 with the spent regeneration gas passing out of cyclone separation means 23 and out of vessel 2 via spent-regeneration gas outlet means 24 located in the upper portion of chamber 2 while catalyst passes through dipleg 25 directed downward toward dense bed 5 located in the lower portion of chamber 2 which bed has a level or interface at 26. Typically gas outlet means 24 will be a conduit having a flow control means located thereon to control the flow of spent regeneration gas leaving chamber 2. The preferred separation means described above permits the cyclone separation means in an existing regeneration vessel to remain in essentially their original position thus simplifying the modification required to convert such an existing regeneration vessel into the regenerated-catalyst receiving chamber of my apparatus. Alternatively, with additional modification, inlet 20 of cyclone separation means 19 could be attached directly to outlet means 16 of transfer conduit 3. Regenerated catalyst in dense bed 5 moves in a downward direction and passes out of regenerated-catalyst receiving chamber 2 through both regenerated-catalyst outlet means 32 and though external regenerated-catalyst recycle means 6. Regenerated catalyst leaving dense bed 5 and regenerated-catalyst receiving chamber 2 through outlet means 32 will be returned to the hydrocarbon reaction zone where the catalyst will again become contaminated with coke. An optional regenerated-catalyst stripper 27 may be located in the lower portion of chamber 2 to allow stripping of interstitial and adsorbed regeneration gas from the regenerated catalyst prior to its being returned to the reaction zone. Stripper 27 is not, however, a necessary component of my apparatus. When stripper 27 is employed regenerated catalyst would pass downward over baffles 28 and be countercurrently stripped by a stripping medium, typically steam, entering the bottom of stripper 27 through inlet means 29. Stripped regenerated catalyst would then leave stripper 27 and pass to the hydrocarbon reaction zone via regenerated-catalyst outlet means 32. Control means 33 may be located on outlet means 32 to control the rate of withdrawal of stripped regenerated catalyst. Typically control means 33 will be a slide valve which is operated by a reaction-zone temperature or level controller.

External regenerated catalyst recycle means 6 has an inlet means 39 located in regenerated-catalyst receiving chamber 2 and has an outlet means 12 located in spent-catalyst conduit 7 to allow a portion of hot regenerated catalyst from chamber 2 to be mixed with spent catalyst from the hydrocarbon reaction zone in spent-catalyst conduit 7 and pass in admixture with the spent catalyst into spent-catalyst receiving chamber 1. I have found that this mixing of the recycle regenerated catalyst with the spent catalyst before they enter spent-catalyst receiving chamber 1 disperses the spent catalyst more evenly across the inside cross-sectional area of chamber 1 thereby allowing coke and CO oxidation to occur more uniformly. Optional collecting means 30 located with dense bed 5 can be used to help direct regenerated catalyst from dense bed 5 into inlet means 39 of external regenerated-catalyst recycle means 6. External regenerated-catalyst recycle means 6 will typically comprise a conduit having a control means 31 located thereon to control the amount of regenerated catalyst recycled. Control means 31 would generally be a slide valve whose design and operation is well known to those skilled in the art of fluidized catalyst handling. To provide the head necessary to ensure unidirectional flow of recycled regenerated catalyst the spent-catalyst receiving chamber 1 will be positioned at an elevation with respect to regenerated-catalyst receiving chamber 2 so that at least a portion of dense bed 5 will be above dense bed 4. With this relationship a sufficient head of regenerated catalyst can be maintained to ensure the flow of regenerated catalyst from dense bed 5 to dense bed 4 via spent catalyst conduit 7. Since a portion of external regenerated-catalyst recycle means is external to any other portion of the apparatus, access to any moving parts such as flow control means 31 can be had without necessitating a complete shutdown of the apparatus. Recycle means 6 will generally be designed to recycle an amount of regenerated catalyst equal to about 1 to about 200% but more preferably from about 25 to about 100% of the amount of spent catalyst entering spent-catalyst receiving chamber 1.

An optional internal regenerated catalyst recycle means comprising a catalyst collecting means 35 and a conduit 34 is shown positioned in portion 3A of transfer conduit 3 and in spent-catalyst receiving chamber 1. Catalyst collecting means 35 is positioned in the upper part of portion 3A near the junction of portion 3A and portion 3B of transfer conduit 3. Conduit 34 extends downward through portion 3A of transfer conduit 3 and into the dense-phase bed of catalyst 4 within spent catalyst receiving chamber 1. Catalyst collecting means 35 has a catalyst inlet means 36 and a catalyst outlet means 37 while conduit 34 has an inlet means 37 and an outlet means 38. The catalyst outlet means 37 of collecting means 35 is attached to inlet means 37 of conduit 34 so both are indicated by the same number. A portion of the hot regenerated catalyst passing through portion 3A and entering portion 3B of transfer conduit 3 falls into the catalyst inlet means 36 of collecting means 35 and passes downward through the catalyst collecting means 35 and conduit 34 into dense bed 4 within spent catalyst receiving chamber 1. Returning a portion of the hot regenerated catalyst from transfer conduit 3 to dense bed 4 increases the density and temperature of dense bed 4 and also reduces the catalyst loading of cyclone separation devices 19 and 23. Thus the use of an internal regenerated catalyst recycle means may permit existing cyclone separation devices which otherwise could not handle the anticipated catalyst loading to be used in my apparatus. The internal regenerated-catalyst recycle means will generally be designed to recycle regenerated catalyst in an amount equal to about 1 to about 200% and more preferably from about 25% to about 100% of the spent catalyst entering the spent-catalyst receiving chamber. Typically the recycle means would be supported by attachment means to the inside wall of vertical portion 3A of transfer conduit 3 so that the lower end of conduit 34 would be free to move with expansion and contraction of the regeneration apparatus. For reliability and to avoid any maintenance which would necessitate a shutdown of the regeneration apparatus the internal regenerated-catalyst recycle means will typically be designed with no moving parts such as flow control means.

Materials of construction for building my regeneration apparatus shall be materials which are able to withstand the abrasive conditions inherent in the fluidized-catalyst apparatus and which are able to withstand the high temperatures involved. Specifically, metals such as carbon steel and stainless steel which may or may not be lined with abrasion-resistant refractory linings are contemplated. The spent-catalyst receiving chamber should be so designed and constructed to withstand constant sustained temperature up to about 1400° F. and temperatures up to about 1450° F. or higher for short periods of time up to about 8 hours. The transfer conduit and regenerated-catalyst receiving chamber should be designed to be able to withstand constant sustained operation of 1450° F. but also be capable of withstanding temperatures as high as 1500° F. to 1550° F. for shorter periods of time of up to about 8 hours. The entire apparatus should also be designed for normal operating pressures of from about atmospheric up to about 50 psig.

DESCRIPTION OF THE INVENTION

Having thus described the preferred embodiment of my regeneration apparatus in some detail, reference will now be directed primarily to the process aspects of my invention. At the outset the definitions of various terms will be useful in making clear the operation, objects and advantages of both the process and apparatus of my invention.

A fluid catalytic cracking process basically comprises contacting a hydrocarbon feed with cracking catalyst in a hydrocarbon reaction zone to produce product components and spent catalyst and oxidizing coke from spent catalyst in a catalyst regeneration zone to restore catalyst activity for re-use in the hydrocarbon reaction zone. The term "spent catalyst" as used herein means catalyst withdrawn from a hydrocarbon reaction zone because of reduced activity caused by coke deposites. Spent catalyst can obtain anywhere from a few tenths up to about 5 wt. % carbon but typically in FCC operation spent catalyst will contain from about 0.5 to about 1.5 wt. % carbon. The term "regenerated catalyst" as used herein shall mean catalyst from which coke has been removed by oxidation in a regeneration zone. Regenerated catalyst produced by the process of my invention will typically contain from about 0.01 to about 0.2 wt. % carbon and more specifically and preferably from about 0.01 to about 0.1 wt. % carbon. The term "coke" refers to material comprising primarily carbon and hydrogen which is deposited on catalyst in the hydrocarbon reaction zone and which is removed, to varying degrees, by oxidation in a regeneration zone. The majority of coke is carbon but hydrogen can comprise from about 5 to about 15 wt. % of the coke. In the refining industry coke-containing catalyst samples are commonly and routinely withdrawn from the hydrocarbon reaction zone and the regeneration zone and analyzed for theircarbon content and results are reported as weight percent carbon. While this weight percent carbon result approximate the coke content, it is not, strictly spreaking, equal to the coke content on a particular catalyst sample.

the term "regeneration gas" shall mean, in a generic sense, any gas which is to contact catalyst or which has contacted catalyst within the regeneration zone. Specifically the term "fresh regeneration gas" shall include free-oxygen-containing gases such as air or oxygen-enriched or deficient air which pass into the regeneration zone to allow oxidation of coke from the spent catalyst. Depending upon the operating conditions employed by the regeneration process, particularly the amount of fresh regeneration gas passed into the process, coke can be oxidized to produce partially-spent regeneration gas or spent regeneration gas. The term "partially-spent regeneration gas" shall refer to regeneration gas which has contacted catalyst within the coke oxidation zone (hereinafter described) and which contains a reduced quantity of free oxygen as compared to fresh regeneration gas. The concentration of CO in partially-spent regeneration gas can vary over a wide range of from about 0.1 vol. % up to about 15 vol. % or more but typically partially-spent regeneration gas will contain from about 5 to about 14 vol. % each of CO and $CO_2$ along with various amounts of water, nitrogen and free oxygen. The term "spent regeneration gas" shall mean regeneration gas which contains a reduced concentration of CO as compared to partially spent regeneration gas. Preferably the spent regeneration gas will contain less than about 1000 ppm. of CO and more typically and preferably less than about 500 ppm. CO. It is therefore apparent that the term "essentially complete combustion of CO" as used herein shall mean that the CO concentration in the spent regeneration gas has been reduced to less than about 1000 ppm. and more preferably less than about 500 ppm. Free oxygen, carbon dioxide, nitrogen, and water will also be present in the spent regeneration gas. The free oxygen concentration of the spent regeneration gas will generally be from about 0.1 to 10 vol. % of the spent regeneration gas and more preferably will be from about 0.2 to about 5 vol. %.

The terms "dense-phase" and "dilute-phase" are commonly-used terms in the art of fluidized solids and particularly in the art of fluid catalytic cracking to generally characterized catalyst densities in various parts of the process vessels or apparatus. While the demarcation density is somewhat ill-defined, as the term "dense-phase" is used herein it shall refer to regions within the catalyst regeneration apparatus where the catalyst density is greater than about 5 lb/ft$^3$ and as "dilute-phase" is used herein it refers to regions where the catalyst density is less than about 5 lb/ft$^3$. Usually the dense-phase density will be in the range of from about 5 to 35 lb/ft$^3$ or more and the dilute-phase density will be much less than 5 lb/ft$^3$ and in the range of from about 0.1 to about 5 lb/ft$^3$. Catalyst densities within regeneration apparatus are commonly measured by measuring pressure or head differences across pressure taps installed in the apparatus and spaced at known distances apart.

In the process of my invention coke is oxidized in a portion of the regeneration zone referred to as a "coke oxidation zone" to produce partially-spent regeneration gas and regenerated catalyst both of which are passed to another portion of the regeneration zone referred to as a "CO conversion zone" where additional CO is oxidized in the presence of regenerated catalyst and where at least a portion of the heat of CO combustion is transferred to the regenerated catalyst. The mixture of regeneration gas and hot regenerated catalyst are then separated by cyclone separation devices located in a third portion of the regeneration zone referred to as a "separation zone".

With these terms in mind a brief consideration of the operation of typical prior art regeneration processes will make the advantages of my process more apparent. In many typical regeneration processes now used in fluid catalytic cracking CO resulting from the oxidation of coke, is not essentially completely oxidized to $CO_2$. Spent catalyst is introduced into the regeneration zone in which catalyst is maintained in one or more dense-phase beds for total average catalyst residence times of two minutes or more by limiting the superficial velocity of the incoming fresh regeneration gas. The superficial velocity is limited to the transport velocity, that is, the velocity above which large amounts of catalyst would be carried out of the dense bed to the cyclones. Typical velocities are therefore less than about 3 feet per second with about 1.5 to about 2.5 being the usual range. It is this limit on superficial velocity which produces the rather large catalyst inventories found in many prior art regeneration zones. The determination of the inventory in a typical prior art regeneration zone is based upon the feed rate to the FCC process (or more specifically upon the coke yield anticipated from that feed rate) and the superficial velocity in the regeneration zone. This coke yield anticipated from a desired feed rate determines the rate of the fresh regeneration gas to the regeneration zone and this gas rate at a limiting superficial velocity then determines the cross-sectional area of the regeneration zone. With a known catalyst density and height of the dense bed the inventory of the regeneration zone, and for practical purposes for the FCC process, is fixed. Catalyst residence times which result are generally from about 2 to 5 minutes with about 2 to 3 being the general range. Since the amount of catalyst which must be added to a FCC process on a daily basis to make up losses and maintain catalyst activity tends to be a percentage of the total catalyst inventory (typically from about 1 to about 3% of the total inventory depending on such factors as feedstock quality, catalyst attrition resistance, and cyclone separator efficiencies) make up rates for FCC units using most of the prior art regeneration processes tend to be rather large and the cost of such make up catalyst, particularly of the more expensive zeolite-containing catalysts, contributes significantly to the daily operating expense of the FCC process. Additionally the amount of fresh regeneration gas admitted to most prior art regeneration processes is typically controlled by a predetermined temperature differential between the gas outlet section of the regeneration zone and either a dense bed temperature or a dilute phase temperature within the regeneration zone. Such control scheme minimizes excess oxygen and essentially precludes significant CO combustion within any portion of the regeneration zone. Since there is no significant combustion of CO, temperatures within the regeneration zone will generally not be higher than about 1275° F. with the usual range being from about 1150° F. to about 1250° F. When such a control scheme is used the amount of residual coke left on regenerated catalyst is largely a function of regeneration apparatus design, that is, how well gas and solids are mixed, the number of stages used, the residence time, and the resulting temperature. Typically regenerated catalyst will contain from about 0.1 to about 0.4 wt. % carbon. Partially spent regeneration gas is separated from entrained regenerated catalyst by cyclone separation means located within the regeneration zone and separated gas containing CO is passed from the regeneration zone either directly to the atmosphere or to a carbon monoxide boiler where the chemical heat of carbon monoxide is recovered externally to the regeneration zone by combustion as a fuel for the production of steam. Separated regenerated catalyst is returned to the bottom portion of the regeneration zone, leaves the zone and contacts the feed stock in the hydrocarbon reaction zone.

Thus most regeneration processes have one or more of these disadvantages: no provision is made for the essentially complete conversion of CO to $CO_2$ within the regeneration zone and a CO disposal problem thus arises; with CO conversion essentially precluded, the coke oxidation temperature cannot be increased without such methods as burning external torch oil within the zone or increasing the amount of coke on spent catalyst; the regenerated catalyst produced still contains significant amounts of residual coke; and, catalyst inventories and makeup rates tend to be rather large.

With the process of my invention coke from spent catalyst can be efficiently oxidized to produce regenerated catalyst having very low residual coke levels and CO produced can be essentially completely converted to $CO_2$ with at least a portion of the heat of combustion being recovered and used within the process. Efficient oxidation of coke and CO are achieved by employing superficial velocities higher than the transport velocity, oxidizing coke in a coke oxidation zone, converting CO to $CO_2$ in the presence of regenerated catalyst in a CO conversion zone, mixing a portion of hot regenerated catalyst with spent catalyst and passing the catalyst mixture into the coke oxidation zone. More specifically, spent catalyst and fresh regeneration gas are passed into a coke oxidation zone containing a dense bed of fluidized catalyst and coke and CO are oxidized at oxidation conditions including a first temperature to produce regenerated catalyst and partially-spent regeneration gas. Preferred oxidation conditions include a catalyst residence time of less than about 2 minutes, a regeneration gas residence time of less than about 10 seconds, a first temperature from about 1200° F. to about 1400° F., a superficial regeneration gas velocity of from about 3 to about 10 feet per second and a pressure from about atmospheric to about 50 psig. Essentially all of the coke oxidation takes place within the coke oxidizing zone but because of the short regeneration-gas residence time conversion of CO to $CO_2$ within this zone is not complete. Partially-spent regeneration gas and regenerated catalyst are transported from the coke oxidation zone into a CO conversion zone where at CO conversion conditions additional CO oxidation takes place and where at least a portion of the heat of combustion of the CO is transferred to the regenerated catalyst to produce regenerated catalyst at a second temperature higher than the first temperature. Preferred CO conversion conditions within the CO conversion zone include a temperature from about 1250° F. to about 1450° F., a pressure from about atmospheric to about 50 psig., and a superficial gas velocity of from about 10 to about 25 feet per second. No other combustible fluid other than CO need be oxidized within the CO conversion zone because a sufficient portion of the heat of combustion of CO will be transferred to the catalyst within the zone to produce regenerated catalyst at a second temperature within a preferred range of from about 1250° F. to about 1325° F. Regenerated catalyst temperatures higher than about 1325° F. tend to cause excessive amounts of thermal cracking when mixed with the feed stock in the hydrocarbon reaction zone and are therefore to be avoided. The addition of combustible fluids such as fuel gas, feed stock, or torch oil to and the combustion of such fluids within the CO conversion zone is therefore not necessary and indeed may be harmful to the product yields obtained from the FCC process. Regenerated catalyst and spent regeneration gas are then separated at separating conditions by cyclone separation devices located within a separation zone and spent regeneration gas is passed out of the separation zone and the regeneration zone. A portion of regenerated catalyst which has been heated to a second temperature higher than a first temperature within the coke oxidation zone is mixed with spent catalyst and the mixture is passed into the coke oxidation zone to more evenly disperse spent catalyst within the coke oxidation zone and to increase the density and temperature within the coke thereby increasing the rate, evenness and extent of coke and CO oxidation. The remainder of the regenerated catalyst leaves the separation zone and the regeneration zone and is passed to the hydrocarbon regeneration zone. Regenerated catalyst may be optionally stripped of adsorbed and interstitial regeneration gas in a regenerated-catalyst stripping zone.

Thus the process of my invention overcomes disadvantages found in prior art regeneration processes. The process of my invention makes it possible to produce regenerated catalyst samples of which have uniform low residual coke concentrations and therefore higher activity, to eliminate the problem of CO pollution without requiring a CO boiler and to recover within the process at least a portion of the heat of CO combustion for advantageous uses within the regeneration process and the FCC process. The recycle of a portion of hot regenerated catalyst in admixture with spent catalyst back to the coke oxidation zone increases the rate, extent and uniformity of coke and CO oxidation thereby making a smaller regeneration zone possible. The return to the hydrocarbon reaction zone of regenerated catalyst at a temperature higher than that usually obtained in a non-CO-burning regeneration process allows possible reduction in hydrocarbon feed preheat requirements. Dramatic catalyst inventory reductions are possible by my process since the superficial velocity of the fresh regeneration gas into the regeneration zone is not limited to the transport velocity. Superficial velocities in the coke oxidation zone will be in the range of about 3 to 10 feet per second so that catalyst can be carried from the coke oxidation zone into the CO conversion zone. With superficial velocities now 2 to 3 times the transport velocity, catalyst inventories using my process will be about 40 to 60 percent of many typical regeneration processes. As an example, a moderately sized FCC process of the type presently in industry use will contain about 150 tons of catalyst. By using my regeneration process in an FCC process of the same size, a refiner could save the initial investment represented by at least 75 tons of catalyst. Catalyst makeup rates required to make up losses and maintain activity will also be reduced with my process since such rates tend to be a percentage of the total catalyst inventory. Because of the combination of higher temperatures which result from the recycle of hot regenerated catalyst, better gas-solid contact due to the higher velocities now permitted, higher oxygen partial pressures, and increased density of the dense-phase catalyst bed both the rate and extent or degree of completion of coke combustion in my process will be increased. Once-through catalyst residence times can be reduced from the present 2 to 5 minutes found in many typical regeneration processes operating at low superficial velocities to less than about 2 minutes in the coke oxidation zone of my regeneration process. Besides permitting smaller-sized apparatus another result of shorter catalyst residence time is that it may allow the steam stripping of flue gas components from the regenerated catalyst. In spite of the fact that flue gas components are entrained by regenerated catalyst into the hydrocarbon reaction zone and hence become part of a product stream, steam stripping of regenerated catalyst has generally not been practiced because of the longer catalyst residence times in conventional regeneration zones and because the entire catalyst inventory is generally maintained in a single dense bed within the zone. Exposure of this quantity of catalyst to steam for this longer period of time would increase the catalyst deactivation rate. The shorter catalyst residence time in my process however may now permit steam stripping.

I claim as my invention:

1. An apparatus for oxidizing coke on spent catalyst which apparatus comprises in combination:
    a. a spent-catalyst-regenerated-catalyst admixture receiving chamber for containing a dense-phase fluidized bed of catalyst having a spent-catalystregenerated-catalyst admixture inlet means and a fresh-regeneration-gas inlet means connected thereto to allow passage of a spent-catalyst-regenerated-catalyst admixture and fresh regeneration gas respectively into said chamber and having a regenerated-catalyst/regeneration-gas outlet means connected thereto to allow passage of regenerated catalyst and spent-regeneration gas from said chamber;

b. a spent-catalyst-regenerated-catalyst admixture conduit connected to said spent-catalyst-regenerated-catalyst admixture receiving chamber inlet means;

c. a transfer conduit having a substantially vertical portion and a substantially horizontal portion, said vertical portion having an inlet connected to said regenerated-catalyst/regeneration-gas outlet means and said horizontal portion extending into the side of a hereinafter described regenerated-catalyst receiving chamber and having an outlet within said chamber whereby said regenerated catalyst and regeneration gas are carried from said spent-catalyst-regenerated-catalyst admixture receiving chamber in admixture to said regenerated-catalyst receiving chamber;

d. a regenerated-catalyst receiving chamber for containing a dense-phase bed of regenerated catalyst, said chamber having a regenerated-catalyst outlet means and a spent-regeneration-gas outlet means connected thereto to allow passage of said regenerated catalyst and said spent regeneration gas from said chamber and said chamber being adjacent to and at an elevation with respect to said spent-catalyst-regenerated-catalyst admixture receiving chamber to maintain at least a portion of said dense-phase bed of said regenerated catalyst above said dense-phase fluidized bed of catalyst in said spent-catalyst-regenerated-catalyst admixture receiving chamber; and, e. an external regenerated-catalyst recycle means, external from said spent-catalyst-regenerated catalyst admixture receiving chamber, having an inlet means in said regenerated-catalyst receiving chamber and an outlet means in said spent-catalyst-regenerated-catalyst admixture conduit, to allow passage of a portion of said regenerated catalyst from said regenerated-catalyst receiving chamber in admixture with spent catalyst in said spent-catalyst conduit to said spent-catalyst-regenerated catalyst admixture receiving chamber.

2. The apparatus of claim 1 further characterized in that said outlet of said transfer conduit is in communication with a disengaging space provided to separate regenerated catalyst and regeneration gas passing through said conduit.

3. The apparatus of claim 1 further characterized in that said apparatus includes an internal regenerated-catalyst recycle means having an inlet means in said transfer conduit and an outlet means in said spent-catalyst-regenerated-catalyst admixture receiving chamber to allow passage of a portion of said regenerated catalyst from said transfer conduit to said spent-catalyst-regenerated-catalyst admixture receiving chamber.

4. The apparatus of claim 3 further characterized in that said internal regenerated-catalyst recycle means comprises a regenerated-catalyst collecting means having a catalyst inlet means and a catalyst outlet means and a conduit having an inlet means attached to said outlet means of said collecting means and an outlet means.

5. The apparatus of claim 1 further characterized in that said external regenerated-catalyst recycle means comprises a conduit having a flow-regulating means located thereon.

6. An apparatus for oxidizing coke on spent catalyst which apparatus comprises in combination:

a. a spent-catalyst-regenerated-catalyst admixture receiving chamber for containing a dense-phase fluidized bed of catalyst, said chamber having upper and lower sections, a fresh-regeneration-gas inlet means connected to said chamber at said lower section to allow passage of fresh regeneration gas into said chamber through said lower section, a spent-catalyst-regenerated-catalyst admixture inlet means connected to said chamber to allow passage of a spent catalyst-regenerated-catalyst admixture into said chamber, and a regenerated-catalyst/regeneration-gas outlet means at the upper section of said chamber to allow passage of regenerated catalyst and regeneration gas in admixture from said chamber;

b. a spent-catalyst-regenerated-catalyst admixture conduit connected to said spent-catalyst-regenerated catalyst admixture receiving chamber inlet means;

c. a transfer conduit having a substantially vertical portion and a substantially horizontal portion, said vertical portion having an inlet connected to said regenerated-catalyst/regeneration-gas outlet means and said horizontal portion extending into the side of a hereinafter described regenerated-catalyst receiving chamber and having an outlet means within said chamber in communication with a disengaging space whereby said regenerated catalyst and regeneration gas are carried in admixture from said spent-catalyst-regenerated-catalyst admixture receiving chamber to said disengaging space;

d. a regenerated-catalyst receiving chamber for containing a dense-phase bed of regenerated catalyst, said chamber being adjacent to and at an elevation with respect to said spent-catalyst-regenerated-catalyst admixture receiving chamber to maintain at least a portion of said bed of regenerated catalyst above said dense-phase fluidized bed of catalyst in the spent-catalyst-regenerated-catalyst admixture receiving chamber, said regenerated-catalyst receiving chamber having upper and lower sections, a spent-regeneration-gas outlet means connected to said chamber at its upper section to allow passage of spent regeneration gas from said chamber, and a regenerated-catalyst outlet means at its lower section to allow passage of said regenerated catalyst from said chamber; and, e. an external regenerated-catalyst recycle means, external to said spent-catalyst-regenerated-catalyst admixture receiving chamber, comprising a conduit having a flow-regulating means located thereon and having an inlet means in said regenerated-catalyst receiving chamber and an outlet means in the spent-catalyst-regenerated-catalyst admixture conduit to allow passage of a portion of said regenerated-catalyst from said regenerated-catalyst receiving chamber in admixture with spent catalyst to said dense-phase fluidized bed of catalyst in the spent-catalyst-regenerated-catalyst admixture receiving chamber.

7. The apparatus of claim 6 further characterized in that said apparatus includes an internal regenerated-catalyst recycle means comprising: a regenerated catalyst collecting means, located in the substantially vertical portion of said transfer conduit and having a catalyst inlet means and a catalyst outlet means; and, a downwardly extending conduit, having an inlet means attached to said outlet means of said collecting means and an outlet means located within said spent-catalyst-regenerated-catalyst admixture receiving chamber, to allow passage of a portion of said regenerated catalyst from said transfer conduit to said spent-catalyst-regenerated-catalyst admixture receiving chamber.

* * * * *